United States Patent
Fon et al.

(10) Patent No.: US 7,762,719 B2
(45) Date of Patent: Jul. 27, 2010

(54) MICROSCALE CALORIMETER

(75) Inventors: Chung-Wah Fon, Pasadena, CA (US);
Michael L. Roukes, Pasadena, CA (US);
Wonhee Lee, Pasadena, CA (US);
Hongxing Tang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 650 days.

(21) Appl. No.: 11/578,675

(22) PCT Filed: Apr. 20, 2005

(86) PCT No.: PCT/US2005/013210

§ 371 (c)(1),
(2), (4) Date: Jul. 18, 2007

(87) PCT Pub. No.: WO2006/073426

PCT Pub. Date: Jul. 13, 2006

(65) Prior Publication Data

US 2007/0286254 A1   Dec. 13, 2007

Related U.S. Application Data

(60) Provisional application No. 60/563,600, filed on Apr. 20, 2004, provisional application No. 60/659,521, filed on Mar. 8, 2005.

(51) Int. Cl.
*G01K 17/00* (2006.01)
(52) U.S. Cl. ............................. 374/31; 422/51; 374/208
(58) Field of Classification Search ................... 374/31; 422/51
See application file for complete search history.

(56) References Cited

U.S. PATENT DOCUMENTS

| | | | |
|---|---|---|---|
| 5,388,577 A | 2/1995 | Hubbard et al. | |
| 5,513,636 A | 5/1996 | Palti | |
| 5,801,070 A | 9/1998 | Zanini-Fisher et al. | |
| 6,238,085 B1 * | 5/2001 | Higashi et al. | 374/10 |
| 6,436,346 B1 | 8/2002 | Doktycz et al. | |
| 6,719,582 B1 | 4/2004 | Swanson | |
| 7,033,840 B1 * | 4/2006 | Tagge et al. | 436/147 |

(Continued)

FOREIGN PATENT DOCUMENTS

WO   WO 03/001147 A1   2/2003

(Continued)

OTHER PUBLICATIONS

Thaysen et al., "Polymer-Based Stress Sensor With Integrated Read-out," Journal of Physics D: Applied Physics, vol. 35, Institute of Physics Publishing Ltd., 2002, pp. 2698-2703.

(Continued)

*Primary Examiner*—Gail Verbitsky
*Assistant Examiner*—Mirellys Jagan
(74) *Attorney, Agent, or Firm*—Foley & Lardner LLP

(57) ABSTRACT

Microcalorimeters having low addendum heat capacities and attojoule/Kscale resolutions are provided. These microcalorimeters make use of very small calorimeter bodies composed of materials with very low heat capacities. Also provided are polymer-based microcalorimeters with thermally isolated reagent chambers. These microcalorimeters use a multi-layered polymer membrane structure to provide improved thermal isolation of a reagent chamber.

10 Claims, 4 Drawing Sheets

U.S. PATENT DOCUMENTS

| | | | |
|---|---|---|---|
| 7,338,640 | B2 * | 3/2008 | Murthy et al. .................. 422/83 |
| 2002/0166962 | A1 | 11/2002 | Roukes et al. |
| 2003/0062193 | A1 | 4/2003 | Thaysen et al. |
| 2003/0089182 | A1 | 5/2003 | Thaysen et al. |
| 2003/0100823 | A1 | 5/2003 | Kipke et al. |
| 2003/0186453 | A1 | 10/2003 | Bell et al. |
| 2005/0034529 | A1 | 2/2005 | Tang et al. |
| 2005/0135455 | A1 * | 6/2005 | Peeters et al. .................. 374/31 |
| 2005/0150280 | A1 | 7/2005 | Tang et al. |
| 2007/0206654 | A1 * | 9/2007 | Merzliakov .................. 374/31 |

FOREIGN PATENT DOCUMENTS

| | | |
|---|---|---|
| WO | WO 03/095616 A2 | 11/2003 |
| WO | WO 03/095617 A2 | 11/2003 |
| WO | WO 2004/041998 A2 | 5/2004 |

OTHER PUBLICATIONS

Johannessen et al., "Heat conduction nanocalorimeter for pl-scale single cell measurement," Appl. Phys. Lett., Mar. 18, 2002, 80(11):2029-2031.

Denlinger et al., "Thin film microcalorimeter for heat capacity measurements from 1.5 to 800K," Rev. Sci. Instrum., Apr. 1994, 65(4): 946-959.

Borroni-Bird et al., "An ultrahigh vacuum single crystal adsorption microcalorimeter," Rev. Sci. Instrum., Sep. 1991, 62(9): 2177-2185.

Wang et al., "Hot electron effects and dynamic behavior of gold doped germanium thin filsm as cryogenic phonon sensors," J. Appl. Phys., Jun. 15, 1999, 85(12): 8274-8280.

Roukes et al., "Hot Electrons and Energy Transport in Metals at Millikelvin Temperatures," Phys. Rev. Lett., Jul. 22, 1985, 55(4): 422-425.

Yung et al., "Thermal conductance and electron-phonon coupling in mechanically suspended nanostructures," Appl. Phys. Lett., Jul. 1, 2002, 81(1): 31-33.

Holmes et al., "Measurements of thermal transport in low stress silicon nitride films," Appl. Phys. Lett., May 4, 1998, 72(18), 2250-2252.

Zeller et al., "Thermal Conductivity and Specific Heat of Noncrystalline Solids," Phys. Rev. B, Sep. 15, 1971, 4(6): 2029-2041.

Roukes, M.L., "Yactocalorimetry: phonon counting in nanostructures," Physica B, 1999, 263-264, 1-15.

Fon et al., "Phonon scattering mechanisms in suspended nanostructures from 4 to 40K," Phys. Rev. B, 2002, 66, 045302-1 to 045302-5.

Tighe et al., "Direct thermal conductance measurements on suspended monocrystalline nanostructures," App. Phys. Lett., May 19, 1997, 70(20): 2687-2689.

Elgin et al., "Thermodynamic study of the $^4$He monolayer adsorbed on Grafoil," Phys. Rev. A, Jun. 1974, 9(6): 2657-2675.

* cited by examiner

MICROSCALE CALORIMETER

CROSS-REFERENCE TO RELATED APPLICATIONS

This application claims priority to U.S. Provisional Patent Application Ser. No. 60/563,600, filed Apr. 20, 2004 and to U.S. Provisional Patent Application Ser. No. 60/659,521, filed Mar. 8, 2005, the entire disclosures of which are incorporated herein by reference.

STATEMENT OF GOVERNMENT RIGHTS

Research funding was provided for this invention by the National Science Foundation under grant No. NSF DMR-0102886. The United States Government has certain rights in this invention.

BACKGROUND

Calorimetry is a powerful technique that is widely employed to measure the enthalpy (including enthalpy change) of chemical reactions, and the heat capacity and other physical properties of solid-state systems and materials. Calorimetry is a technique widely used by the pharmaceutical industry, biologists and chemists to study the kinetics of biochemical reactions and the reaction of living organisms and tissues to chemicals (e.g., drugs).

Currently, microcalorimeters produced by semiconductor processing are routinely used for heat capacity studies upon thin films and for measurements of the heat of reaction of catalytic processes. Current microcalorimeters have a resolution typically on the order of ~1 fJ/K, limited by the heat capacity of the calorimeter itself, termed the "addendum," and by and the sensitivity of thermometry utilized. Unfortunately, the relatively poor resolution of these calorimeters render them unsuitable for many small scale applications. The quest to improve the sensitivity of calorimetry is not simply to improve accuracy but, more importantly, to enable measurements upon nanoscale objects such as epitaxial thin films, nanoparticles and nanoclusters, fullerenes, biological macromolecules, and the chemical processes involving individual molecules or individual cells.

Another shortcoming of current microcalorimeters is their inability to take accurate measurements on small volume samples due to insufficient thermal isolation of the samples from the rest of the device. The most common forms of thermal isolation used for calorimeters are thermally resistive enclosures, air cushions (generated by membranes) and insulating substrates. Such techniques are not readily applicable to samples having a volume on the order of 100 pL. A resistive enclosure for a 100 pL volume has to be made as small as the volume itself. The membranes used by the existing microcalorimeters are themselves too conductive (e.g., thermal conductivity of silicon nitride is 30 W/m K) to provide adequate thermal isolation. Finally, because common insulating materials (e.g., foam) are comprised of air sacs which are as big as the microcalorimeter itself, they can not be used as the substrate.

Thus, a need exists for microcalorimeters that provide low addendum heat capacity and high thermal isolation of reagents.

BRIEF SUMMARY

The present invention relates to microcalorimeters. The microcalorimeters, which are typically integrated into substrates, or "chips", are characterized in that they include integrated components having one or more dimensions on the order of millimeters (mm) (e.g., 10 mm or less), micrometers (e.g., 10 micrometers or less) or even nanometers (e.g., 100 nm or less) and are typically integrated into a surface of the substrate using micromachining techniques, such as lithography (e.g., photolithography), etching, sputtering and chemical vapor deposition.

A first aspect of the present invention provides a suspended semiconductor-based microcalorimeter with integrated transducer that provides resolution on the order of tens of attojoules (aJ)/Kelvin (K), and in some instances, sub-aJ/K. These microcalorimeters make it possible to take calorimetric measurements on very small systems, including nanoscale objects such as epitaxial thin films, nanoparticles and nanoclusters, fullerenes, biological macromolecules, and the chemical processes involving individual molecules or cells.

The improved resolution of the present microcalorimeters is attributed, at least in part, to the small addendum heat capacity of the calorimeters compared to other microcalorimeters. This small addendum heat capacity is, in turn, attributed, at least in part, to the use of a calorimeter body having a very small volume and constructed from a material having a very small heat capacity. At low temperatures (e.g., $T \leq 5K$), the high resolution is maintained by using transducers (i.e., heaters and thermometers) having very small volumes, low electronic heat capacities and low thermal conductivities.

In one basic embodiment the microcalorimeter includes a substrate, a calorimeter body suspended above, and connected to (including but not limited to being thermally anchored to) the substrate and a transducer integrated with the calorimeter body (i.e., the transducer is formed on and/or in the calorimeter body). The transducer includes an optional heater and a thermometer and is in electrical communication with at least one lead.

The substrate is typically a semiconductor substrate, such as a silicon (Si) or a gallium arsenide substrate, or a glass, plastic or other insulating substrate. It should be noted that the term "substrate" as used herein includes a "bottom" semiconductor or insulating wafer or substrate, as well as a substrate with additional layers or structures thereon. Thus, the calorimeter body may contact and be thermally anchored to the "bottom" substrate and/or to additional layers and structures on such a "bottom" substrate. The use of semiconductor substrates has the advantage of making it possible to construct the microcalorimeters using standard semiconductor processing techniques. The calorimeter body is typically a plate suspended above a pit in the substrate. The pits may be etched into the semiconductor substrates using standard lithographic techniques. Samples may be externally affixed (phonon-coupled) to the surface of the plate. The plates are desirably fabricated from thin (e.g., 0.1 to 0.5 microns, such as 0.2 µm) membranes of low heat capacity materials deposited on the substrate. The plate may be supported by and thermally anchored to the substrate by one or more beams of the membrane material. For example, in one exemplary embodiment the plate is suspended over the substrate by one or more beams, such as four beams extending from four corners of the plate. The term "beam" may include narrow bar shaped beams as well as broad plate or diaphragm shaped beams. Low heat capacity materials that may be used to make the plates include, but are not limited to silicon nitride ($Si_3N_4$) and silicon carbide (SiC). In order to keep the addendum heat capacity of the microcalorimeter to a minimum, the volume of the plates are minimized. For example, in some embodiments, the plates have a volume of no more than about 200

μm$^3$. This includes embodiments where the volume of the plate is no more than about 100 μm$^3$, such as 50 to 100 microns cubed.

The transducer includes at least one optional heater and at least one thermometer, both of which may be integrated with (i.e., on and/or in) the calorimeter body. The heater may be omitted if the heat is generated by a chemical reaction being measured or by radiation provided onto the device, etc. For example, the heater may be a thin film metal heater and the thermometer may be a thin film thermometer deposited onto the upper surface of the calorimeter plate. Like the plate itself, the transducer (i.e., the heater and thermometer) is desirably very small and made from low heat capacity materials in order to reduce the addendum heat capacity of the microcalorimeter. In one exemplary embodiment, the heater is a gold (Au) heater and the thermometer is a thin film AuGe thermometer. Other conductive materials, such as chromium, for example, may also be used. The longest cross-sectional dimension of the heater and thermometer is desirably no greater than about 10 μm and more desirably no more than about 5 μm, such as about 2 to 5 microns.

The transducer is in electrical communication with one or more electrical leads. The selection of lead materials will depend on the intended operating temperature of the microcalorimeter. For example, at low temperatures where the heat capacity of electrons becomes dominant (e.g., $T \leq 0.5K$), it may be desirable to use superconducting leads, such as niobium leads. At higher temperatures (e.g., $T \leq 5K$), the heat capacity and thermal conductivity of metal leads, such as Au leads, may be sufficiently small to provide a microcalorimeter with improved resolution.

The microcalorimeters provided herein are capable of taking calorimetric measurements with resolutions on the scale of hundreds of aJ/K (e.g., $\leq 100$ aJ/K) or better at a temperature in the range of about 0.5 to 10 K (e.g., about 1 to 5K). This includes embodiments where the microcalorimeters provide a resolution of 10 aJ/K or better and further includes embodiments where the microcalorimeters provide a resolution of 1 aJ/K or better at a temperature in the range of about 0.5 to 10 K. In some embodiments, these resolutions are achieved at a temperature in the range of about 1 to 5K. Thus, the resolutions are preferably about 0.34 to about 10 aJ/K, such as about 0.5 to about 2 aJ/K.

A second aspect of the invention provides a polymer-based microcalorimeter where the microcalorimeter body comprises a polymer membrane, such as a parylene or PDMS membrane. Preferably, the microcalorimeter is integrated with microfluidics, such that the device is capable of performing isothermal titration and differential scanning calorimetric measurements on picoliter (pL) scale samples. In some embodiments, the samples include chemical reagents with volumes of about 50 to 2000 pL and living tissues. The improved sensitivity of these microcalorimeters is due, at least in part, to the use of a vacuum or gas-isolated reagent chamber housed within a microcalorimeter compartment having a multi-layered polymer construction which provides improved thermal isolation of the reagents.

A basic embodiment of the microcalorimeters of this second aspect of the invention includes a compartment for housing a reagent chamber. The compartment is composed of multiple layers of polymer membranes which are separated by gaps. The polymer membrane used in the construction of the compartment may have a sufficiently low gas permeability to sustain a vacuum in the compartment, such that the reagent chamber is thermally isolated. Alternatively, rather than using a vacuum, the reagent chamber is thermally isolated from the environment by one or more gas filled gaps between the polymer membranes or layers. Any suitable gas, such as air or an inert gas, such as nitrogen or argon, may be used to fill the gap or gaps to thermally isolate the reagent chamber. The reagent chamber is supported on a layer of the polymer membrane and is itself desirably constructed of the polymer membrane. Parylene is the preferred polymer membrane material for the construction of the compartment because of its low thermal conductivity, gas permeability and available valve structures. The thickness of the polymer membrane is desirably minimized in order to maximize the thermal isolation of the reagents held within the reagent chamber. For example, in some embodiments the polymer membrane has a thickness of no more than about 5 μm. This includes embodiments where the polymer membrane has a thickness of no more than about 2 μm and further includes embodiments where the polymer membrane has a thickness of no more than about 1 μm, such as about 0.5 to about 2 microns. The gaps between the polymer membrane layers are generally quite thin. For example, the gaps may have a height of no more than about 20 μm, 10 μm, or even 5 μm, such as about 3 to about 10 microns.

The reagent chamber is in fluid communication with a microfluidic channel for delivering reagents to the chamber. A microvalve is disposed between the reagent chamber and the microfluidic channel, such that the reagent chamber may be isolated from the channel after delivery of the reagents by closing the valve. Once the valve to the reagent chamber is closed, the compartment may be pumped down using any suitable pumping device. For example, a mechanical pump in fluid communication with the compartment may be used to create a vacuum of, for example, 1 mbar or lower in the compartment. A valve may be provided between the pumping device and the compartment in order to isolate the compartment after it has been evacuated.

In a preferred construction, the compartment, the microfluidic channel and the microvalve are all constructed of parylene and integrated into a silicon chip. A micropump may also be integrated into the chip in order to facilitate the delivery of the reagent to the reagent chamber.

The reagent chamber of the present microcalorimeters may have a volume of 2000 pL or less. This includes embodiments where the reagent chamber has a volume of 1000 pL or less, 500 pL or less, 100 pL or less, and 10 pL or less, for example about 5 pL to about 10 pL.

DETAILED DESCRIPTION

High Resolution Microcalorimeter

One aspect of the present invention provides a nanofabricated calorimeter enabling ultrasensitive heat capacity measurements upon externally-affixed (phonon-coupled) samples at low temperatures. For example, in one embodiment an unprecedented resolution of $\Delta C \sim 0.5$ aJ/K ($\sim 36.000$ kg) may be achieved with a 10 s measurement at 2K. This sensitivity enables, for example, applications such as heat capacity measurements upon zeptomole-scale (e.g., $\leqq 1000$ zmol) samples, upon adsorbates at extremely minute coverage, or resolution of the heat of formation of individual molecules, or radiation energy coupled into the microcalorimeter.

Figure 1:
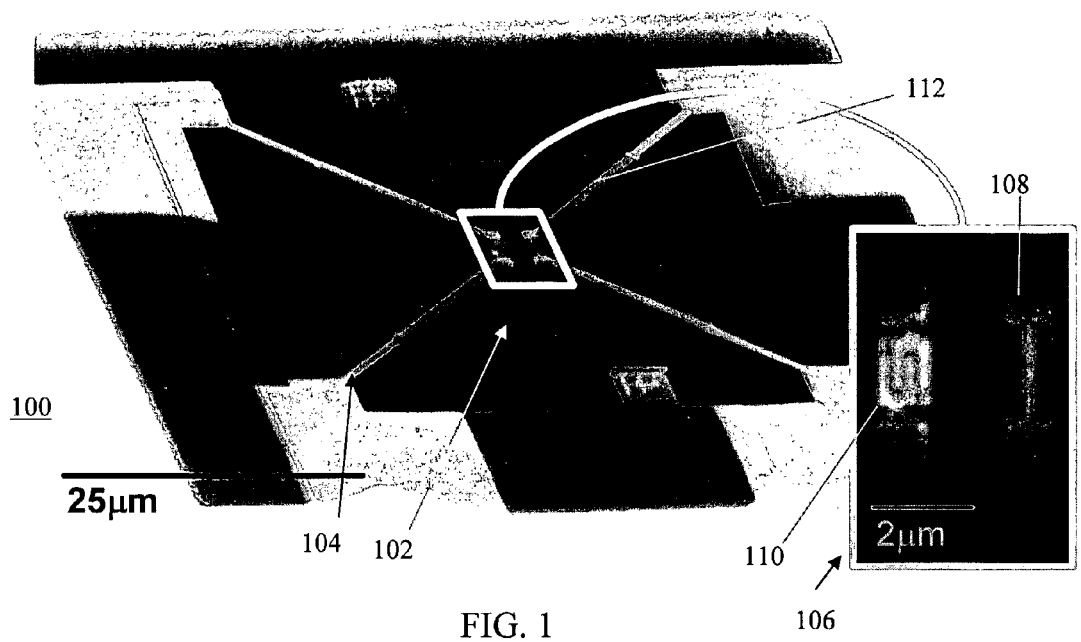
FIG. 1 shows an electron micrograph of a high resolution microcalorimeter in accordance with the present invention. The inset shows a magnified view of the central portion of the suspended region, displaying an interdigitated AuGe thermometer (left) and an Au heater (right).

For illustrative purposes, the following description will refer to the microcalorimeter shown in FIG. 1. However, it should be understood, that the calorimeter of FIG. 1 is used only to exemplify the invention and is not intended to provide a limiting description or embodiment.

FIG. 1 shows a scanning electron micrograph of the calorimeter 100. The suspended body of the calorimeter is a $25 \times 25$ $\mu m^2$ "plate" 102 patterned from a 120 nm thick membrane of quasi-amorphous silicon nitride (hereafter $\alpha$-SiN). The calorimeter body is suspended, and thermally anchored, to the substrate by four 8 $\mu m$ long and 600 nm wide and 120 nm thick $\alpha$-SiN beams 104. Nanofabricated transducers 106 are defined at the center of the calorimeter body; these comprise a Au heater 108 and a AuGe thermometer 110. They permit in-situ heating and temperature measurement, respectively. Nb leads 112 running on top of the beams provide electrical connection to the transducers. These provide electrical contact to the transducers, without adding parasitic thermal contact to the environment (for $T<T_c(Nb) \approx 8K$).

The device may be fabricated using standard micromachining techniques, such as by electron beam lithography, plasma dry etching and several steps of metal film deposition. The membrane may be formed from a low stress $\alpha$-SiN film deposited by low pressure chemical vapor deposition (LPCVD) on a silicon substrate, and subsequently patterned using a standard back-side KOH etch. The AuGe thermometer is deposited by sequential elemental vapor deposition. Electrical connections to the AuGe layer are provided by two interdigitated Au electrodes (FIG. 1 inset) that limit the thermometer resistance to below 20 $K\Omega$. The Au electrodes also assist electron cooling in the biased thermometer. Superconducting electrical leads are formed by subtractive patterning of plasma-deposited Nb. At 2K, the resistance of the heater and thermometer are $\sim 200 \Omega$ and $\sim 12 \Omega$, respectively.

The small total volume of the metallic transducers ensures a minuscule contribution of heat capacity to the addendum. This is particularly important below 0.5K when the heat capacity of electrons becomes dominant. Also, high speed thermometry (bandwidth>200 kHz) is desirable to track the fast relaxation of the calorimeter (relaxation time, $\tau \sim 20$ to 100 $\mu s$). Thus, high impedance thermometers based upon superconducting tunnel junctions and Mott insulators ($Z \sim 1$ $M\Omega$) are not preferred since they would require complex readout schemes to stain the requisite bandwidths. In this embodiment thin film AuGe thermometers are employed, which provide a large temperature coefficient. $(1/R_{th})(\partial R_{th}/\partial T) \approx -1\%/K$. The probe current for these transducers is limited at low temperatures by electron-phonon decoupling to <20 nA for T<0.5 K. Below about 0.3K this may impose a limit to the utility of this thermometer.

The calorimeter's operation was characterized by measuring its addendum heat capacity in the time domain. First, the device was cooled in a $^3$He cryostat and the AuGe thermometer was calibrated against a commercial NTD Ge thermometer. Small probe currents were employed to preclude electron heating. The temporal evolution of the voltage drop across the thermometer was fed to a low-noise preamplifier and subsequently captured by a fast digital oscilloscope. To measure the heat capacity, a heat pulse was delivered to the calorimeter. It was generated by applying a current pulse to the heater, which delivers power P during its application. At the rising edge of the heat pulse, the temperature of the calorimeter rises exponentially. $T=T_u-|P/G(T)||1-\exp[-1/\tau(T)]|$. Here, G(T) is the thermal conductance and $\tau(T)$ the thermal relaxation time constant of the calorimeter, respectively. From the temperature time records captured in response to small pulses, G and $\tau$ were extracted; together these yielded the heat capacity through the relation $C=G\tau$. To improve accuracy, the measurement was repeated and averaged, typically for $10^5$ to $10^6$ times. This represents, at most, a $\sim 10$ s total measurement interval, but actually involves an elapsed time $\sim 20$ s (simply due to the fact data transfer is not completely optimized in this setup).

Figure 2:
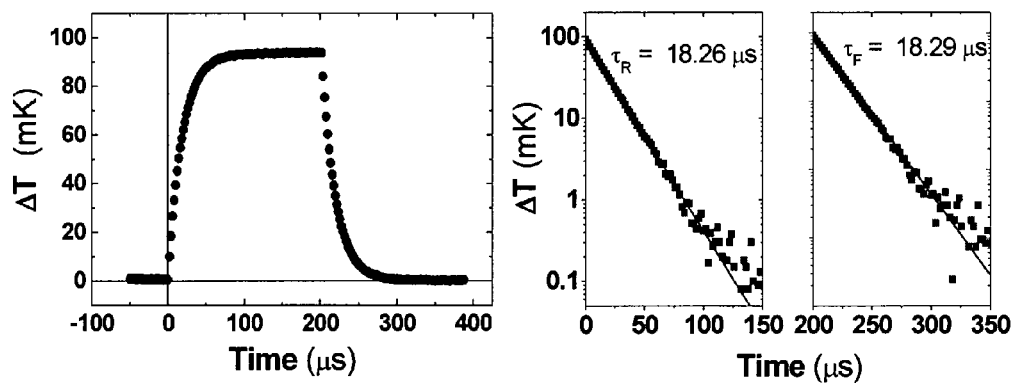
FIG. 2 shows the time record of the temperature of the microcalorimeter of FIG. 1 in response to a heat pulse starting at T=4.5K.

FIG. 2 shows the calorimeter's exponential temporal response to the heat pulses at T=4.5 K. The heat pulse power while applied is 0.125 nW, the resulting rise in temperature is $\Delta T=93.4$ mK and the rise and fall constants are $\tau_R=18.26+/-0.002$ microseconds and $\tau_F=18.29+/-0.002$ microseconds, respectively. From these traces, representing the average of $2 \times 10^5$ separate measurements, the thermal conductance is deduced to be G=1.32 nW/K and the heat capacity, C=24.5 fJ/K at T=4.5K. The difference between $\tau_R$ and $\tau_F$ arises from the temperature dependence of the thermal relaxation time. The rise starts from T=4.5 K while the fall begins at 4.5+0.0934=4.5934 K. Accordingly, only the pulse rises are employed in the analysis of the heat capacity.

Figure 3:
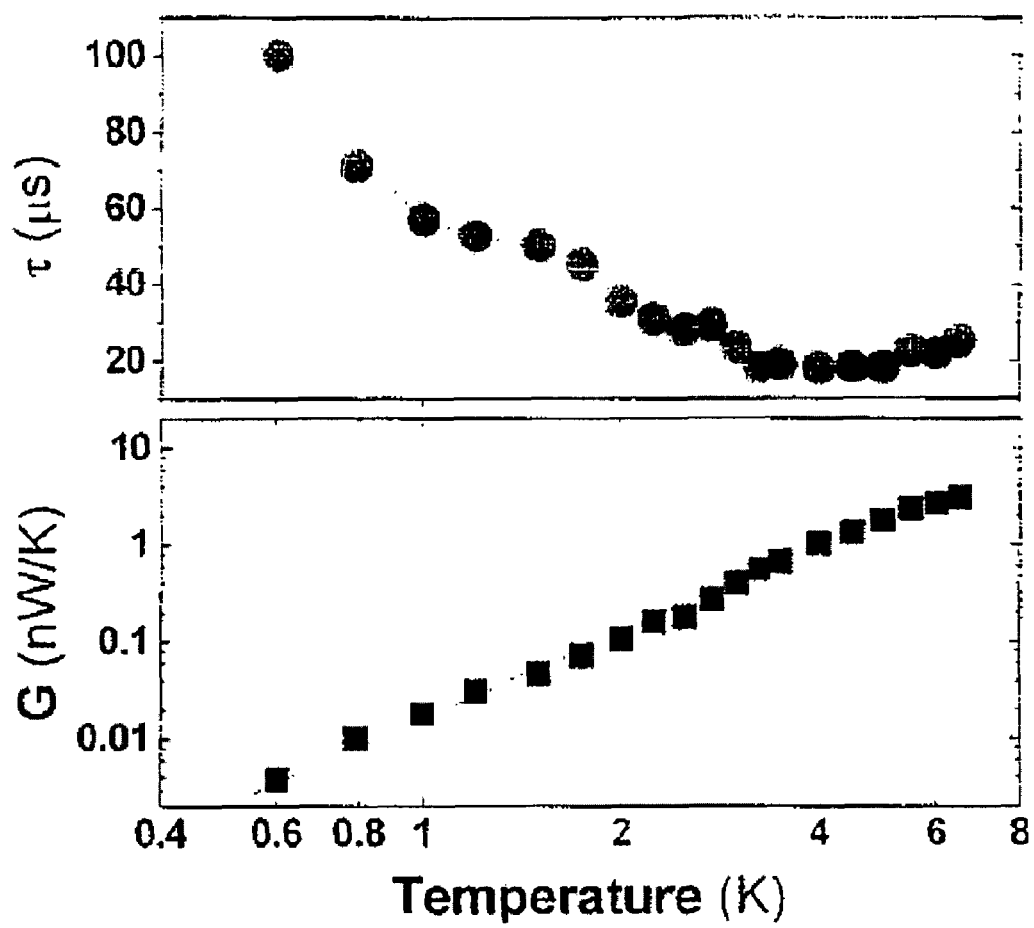
FIG. 3 shows the thermal relaxation time, τ, and the thermal conductance, G, of the microcalorimeter of FIG. 1 measured from 0.6 to 7K.
Figure 4:
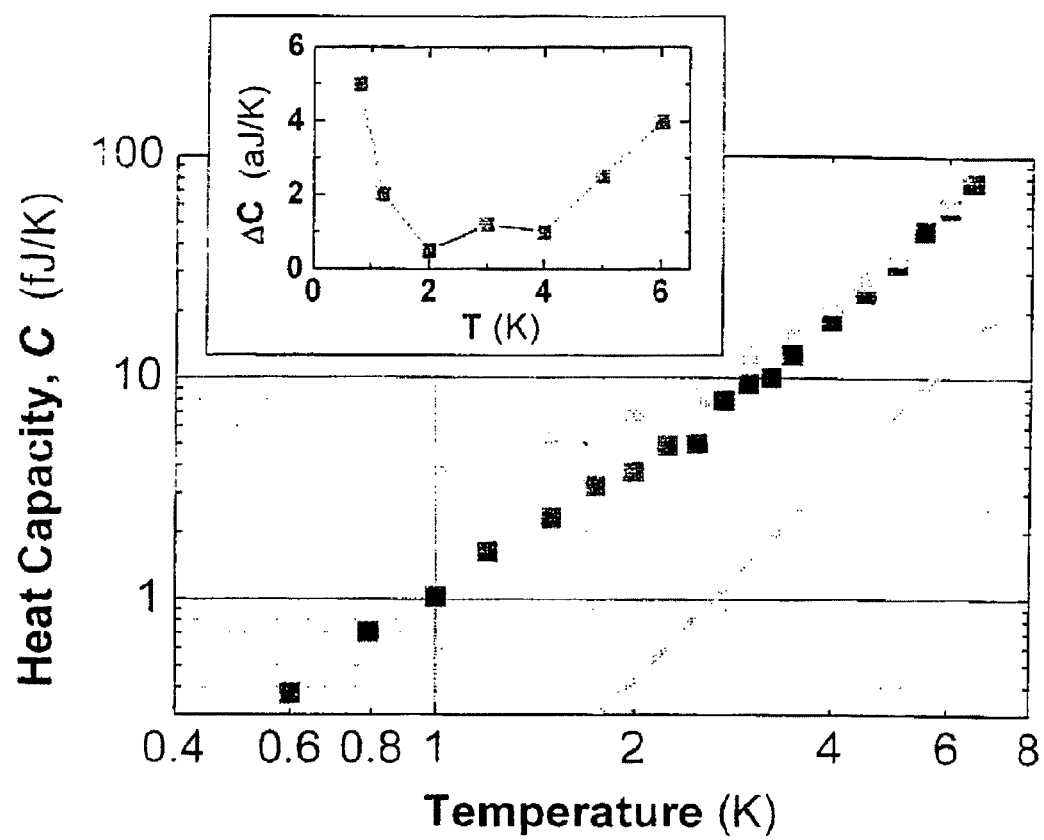
FIG. 4 shows the heat capacity of the microcalorimeter of FIG. 1 (black) and the heat capacity of the microcalorimeter with an adsorbed He gas film (grey) at ~0.16 monolayer coverage over the device. The dashed grey line represents the estimated Debye phonon heat capacity of the microcalorimeter. The inset shows the measurement resolution attained at various temperatures by the microcalorimeter for 10 second averaging time.

From this data the addendum heat capacity was determined to be C=24.5 fJ/K. Many such measurements carried out over a range from 0.6K<T<8K provided the temperature dependence of the thermal conductance and thermal relaxation time constant (FIG. 3). The thermal conductance, G, of the calorimeter follows expectations for diffusive phonon transport involving a boundary-scattering-limited mean free path. The displayed fit in FIG. 3 yields $G=0.0016$ $T^3$ (nW/K). These, in turn yielded the addendum heat capacity (FIG. 4). FIG. 4 shows the heat capacity of the microcalorimeter with and without the adsorbed He film in fJ/K, while the inset to FIG. 4 shows the difference between them ($\Delta C$) in aJ/K. The highest resolution in FIG. 4, $\Delta C$ of about 0.5 aJ/K (about 36,000 $k_B$) is obtained at 2K in the experiments. It is believed that the microcalorimeter would have a high resolution at higher temperatures as well, such as at temperatures between 5K and room temperature.

The addendum heat capacity is dominated by the $\alpha$-SiN calorimeter body. Contributions from the phonon and electron heat capacities of the heater, thermometer and leads are, by comparison, relatively small. FIG. 4 shows that the measured addendum heat capacity is significantly larger than the Debye phonon heat capacity of the calorimeter body itself (estimated to be $\sim 0.05$ fJ/K). This extra heat capacity likely originates from defects, i.e., from tunneling motional states of the ions within the quasi-amorphous $\alpha$-SiN layers. To estimate the contribution of the tunneling states to heat capacity, they were modeled as two level systems with a white spectrum of activation energies between 0<T<100K. From such analysis it was concluded that a density of $10^{18}$ cm$^{-3}$ of tunneling states would account for the extra heat capacity; this is similar to what has been observed in vitreous silica. The phonon mean free path deduced, using a simple diffusive transport picture, from the thermal conductance is $1_{ph} \approx 0.2$ μm. This short mean free path arises from the strong surface scattering of phonons and is consistent with previous thermal measurements upon nanoscale devices.

The calorimeter's resolution of heat capacity, ΔC, was evaluated by computing the uncertainty in the addendum measurement. Typically, at each temperature studied, ~$10^3$ precisely-triggered measurements of the pulse-heating response were averaged. These provide average exponential rise and decay times, $\tau_R$ to obtain an average value of heat capacity (FIG. 2). This process was repeated ~$10^2$ times to obtain a histogram for the addendum heat capacity. The distribution of measured values was assumed to be Gaussian, and a nonlinear least-squares fit was employed to extract the mean value of the heat capacity and its variance. The square root of the latter represents the measurement resolution, ΔC.

The high resolution of the calorimeter primarily originates from the small addendum heat capacity of the device. This, in turn, is largely a consequence of the small volume of the α-SiN calorimeter body. To maintain this small addendum below 2K, it is important to minimize the electronic heat capacity in the heater, thermometer and leads. For this reason, submicron-scale transducers (heater and thermometer) were utilized to obtain very small transducer volumes, and superconducting electrical connections to these transducers were employed to preclude parasitic thermal coupling to the calorimeter body.

Figure 5:
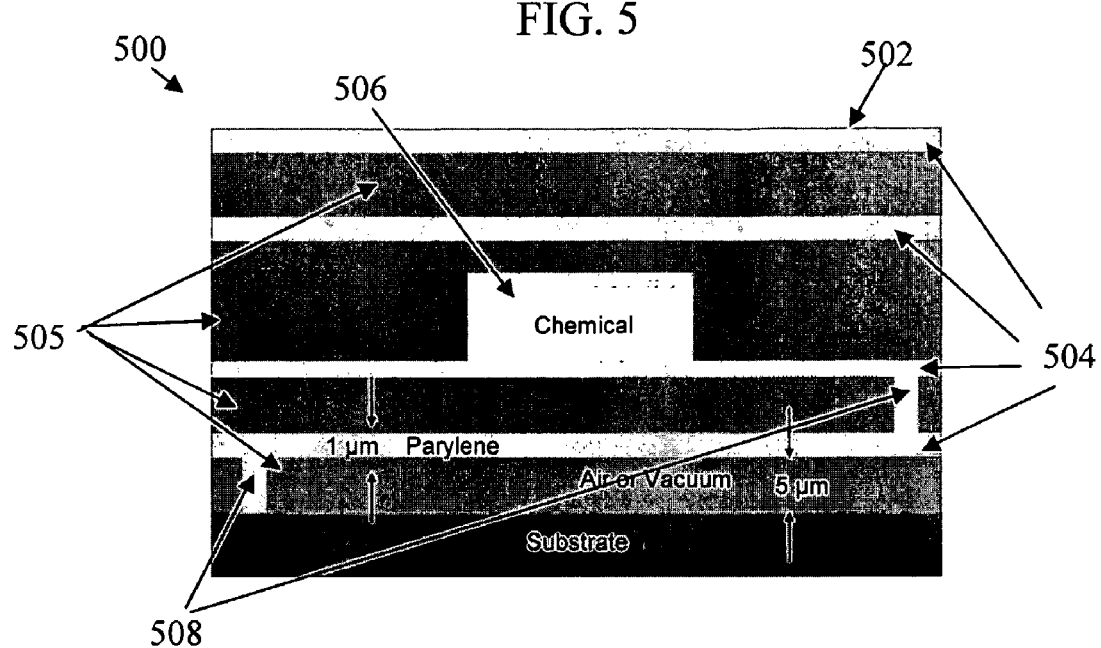
FIG. 5 shows a schematic diagram of a cross-sectional view of a portion of a microcalorimeter compartment composed of multiple layers of a polymer membrane, in accordance with an embodiment of the present invention.

The resolution of the calorimeter can be written as:

$$\Delta c(T) = \frac{1}{\Delta V_{th}(T)} \left[ \frac{2}{N} \int_0^\tau H(\omega) S_V(T) d\omega \right]^{1/2} C(T) \quad (1)$$

$$= \frac{G(T)C(T)}{PI_{th}[\partial R(T)/\partial T]} \left[ \frac{2}{N} \int_{\omega_{min}}^\infty \frac{S_V(T)}{1+[\omega\tau(T)]^2} d\omega \right]^{1/2}$$

where $S_V$ is the effective spectral density of the voltage noise (from all sources, referred to transducer's output), $\Delta V_{th} = (P/G)(\partial R/\partial T)I_{th}$ the (asymptotic) rms voltage signal from the thermometer in response to continuous application of heater power P, $H(\omega)$ the frequency response function defining the single-shot measurement bandwidth, N the number of repeated measurements, and $I_{th}$ the thermometer sensing current. In this analysis it is assumed that $H(\omega)$ has an abrupt high-pass cutoff at $f_{min}$ and thereafter follows a low-pass rolloff set by the thermal time constant, $\tau(T) \sim G(T)/[2\pi C(T)]$. In Eq. 1 terms that are explicitly temperature dependent are denoted; it should be noted, however, that implicit limitations to P and $I_{Th}$ arise from these explicit dependencies. Principal contributions to N arise from the transducer's Johnson and 1/f noise and readout amplifier noise. In these experiments the 1/f noise is predominant, and yields noise voltage (integrated across the measurement band from 0.1 Hz to 1 MHz) of ~10 μV. Using Eq. 1 and values from a table for T~2K yields a predicted resolution of ΔC~0.34 aJ/K for a measurement integration time of τ~10 s (i.e., N=t/τ~100,000), quite close to the sensitivity attained in the experiments. Optimum resolution is found at T~2K (FIG. 5, inset). Above 2K resolution decreases with the increased addendum heat capacity. Below this temperature resolution becomes limited by the restricted thermometer probe current and degradation of thermometer sensitivity due to the electron heating.

To demonstrate operation of the calorimeter, the heat capacity of an adsorbed $^4$He film was measured. A coverage of ≈2 atoms/nm$^2$ (~0.16 monolayers) was accreted upon the calorimeter (A~1200 μm$^2$) by introducing a controlled pressure of helium gas to the evacuated, cooled cryostat. The heat capacity of the film was measured to be ~3 fJ/K (FIG. 4), which corresponds to a heat capacity of 1.4 $k_B$ per helium atom. The adsorbed helium atoms evidently behave like a two dimensional ideal gas, similar to the case of He adsorbed on grafoil.

At temperatures above 7K the electronic heat capacity and thermal conduction of normal metal leads are still relatively small. Moreover, strong electron-phonon coupling at higher temperatures will ensure all heat generated within the heater is transferred to the lattice. Hence, replacement of the Nb leads with ones patterned from normal metal (e.g., Au) should enable excellent performance at higher temperatures (e.g., from 5K to room temperature). Further reduction in device size and use of material with a smaller heat capacity, such as SiC, for the calorimeter body may improve the device sensitivity by one to two orders of magnitude. In addition, for operation at lower temperatures (e.g., below 0.3K), more exotic thermometry, such as SQUID-read-out noise thermometry and RF-SET-read-out superconducting tunneling junctions may desirably be employed.

Polymer-Based Microcalorimeter

The polymer-based microcalorimeters provided herein include a microcalorimeter compartment housing a thermally isolated reagent chamber for reagents designed to provide for calorimetric measurements on pL-scale volumes of reagents. Because of the small volume of reagents and/or living tissues involved in some calorimetric studies, the enthalpy change due to the chemical and biochemical reactions may be very low. For example, for a biochemical reaction with a typical power of 1 to 10 nW for 100 pL of reagents, a resolvable temperature gradient from the power may be generated if the total thermal conductance of the compartment to the environment is very low (e.g., ~1 μW/K). Thus, the average conductivity of the constructing material is also desirably very low (e.g., ~0.03 W/m K). For this reason, the present inventors have selected polymer membranes having low conductivities for the construction of the microcalorimeter compartments. Furthermore, the reagent chamber is thermally isolated from the environment by gas or vacuum filled gaps between the polymer layers. Preferably, the reagent chamber is thermally isolated from all sides (i.e., top, bottom and sides) by these gaps. Table I below shows the thermal conductance of some materials. As can be seen from Table I, a gas, such as air has a very low thermal conductance. Likewise, polymer materials such as parylene and PDMS have a lower thermal conductance than the common metals, semiconductors and their oxides and nitrides. Thus, the use of polymer materials thermally isolated by gas or vacuum gaps provides a high level of thermal isolation from the environment.

TABLE I

|   | g at RT (W/m K) |
|---|---|
| Al | 130 |
| Au | 320 |
| Ni | 100 |
| Ni—Cr | 12 |
| Ti | 15 |

TABLE I-continued

|  | g at RT (W/m K) |
| --- | --- |
| Air | 0.025 |
| $H_2O$ | 0.6 |
| Si | 150 |
| SiN | 30 |
| $SiO_2$ | 1.5 |
| Pyrex glass | 0.8 |
| PDMS | 0.15 |
| Parylene | 0.15 |

For illustrative purposes, the vacuum and/or gas isolated reagent chamber for the present microcalorimeter will be described with respect to the embodiment shown in FIG. 5. However, it should be understood that FIG. 5 shows only one exemplary embodiment of the invention and is not intended to limit its scope. As shown in FIG. 5, the microcalorimeter 500 includes a compartment 502 composed of a multiple layers of parylene membrane 504 with gas filled or vacuum gaps 505 between the parylene layers 504 providing thermal isolation to the reagent chamber 506 housed within the compartment. One or more of the parylene membranes of the reagent chamber 506 make up the calorimeter body. The reagent chamber is connected to a channel for fluid delivery (not shown) through a valve (not shown). The suspended parylene structure may be fabricated by standard semiconductor processing techniques. A description of suitable methods for constructing a multi-layered parylene structure using a multi-layer parylene process may be found in U.S. Patent Application Publication No. 2004/0188648, the entire disclosure of which is incorporated herein by reference.

In the exemplary embodiment of FIG. 5, the compartment has a length of about ~500 μm, the parylene membranes 504 have a thickness of about 1 μm and the gaps 505 separating the different membrane layers have a height of about 5 μm, however, other dimensions are possible. This compartment includes 4 layers of parylene membrane, which may be connected by parylene poles or posts 508 for mechanical support. The poles or posts also provide the sidewalls for the gaps 505 such that a gas or vacuum may be maintained in the gaps. If the gaps 505 defined between the layers of parylene membrane 504 contain a vacuum rather than a gas, then these gaps 505 are in fluid communication with a vacuum pump (not shown) so that they can be evacuated to provide thermal isolation of the reagent chamber 506. In most applications, air filled gaps can provide sufficient thermal isolations. In this case, evacuation of the gaps is not required.

An inexpensive mechanical pump or micro-pump may be used to create a vacuum in the compartment. This is possible because of the low gas permeability of parylene. A 1 mbar vacuum, coupled with the small dimension of the gas layer, has a thermal conductivity of 0.0005 W/m K. The resultant compartment has a thermal conductance of 0.1 μW/K from the vacuum (residual air) and 0.4 μW/K from the parylene membrane. Thus, the total thermal conductance of the compartment in this embodiment is 0.5 μW/K. In contrast, if the vacuum space is filled up to the atmospheric pressure, the thermal conductance is 5 μW/K.

The microcalorimeters are desirably designed to take advantage of microfluidics for the automated delivery of reagents to the reagent chamber using microfluidic channels, microvalves and micropumps for pumping the fluid, all, or some, of which may be integrated into a microcalorimeter substrate. A range of different materials can be used to construct these microfluidics components. In a preferred embodiment, the microcalorimeters, including the valves, channels and compartment, are parylene-based. A description of suitable electrostatic-actuated parylene-based microvalves and methods for making such microvalves may be found in U.S. Patent Application Publication No. 2004/0188648, the entire disclosure of which is incorporated herein by reference. A description of suitable electrochemical micropumps and methods for making such pumps may be found in U.S. Patent Application Publication No. 2004/0124085, the entire disclosure of which is incorporated herein by reference.

A thermometer is disposed in thermal communication with the reagents in the reagent chamber. For example, a metal thermometer may be deposited on the surface of one of the polymer membranes that defines the reagent chamber. The thermometer may be located inside or outside the reagent chamber. The thermometry determines the temperature change due to the reactions of biochemical reagents. In some embodiment, the thermometer is a thermopile. The thermopile thermometry can be comprised of different metals. In preferred embodiments, gold and Cr are used, due to their ease of fabrication and reliability. This thermopile thermometry generally provides a responsivity of 200 to 500 μV/K. This corresponds to a temperature sensitivity of ~0.1 mK. Furthermore, an optional heater may be provided in thermal communication with the reagent chamber. The heater may be a thin metal film located inside or outside the reagent chamber on a surface of one of the membranes. The heater may be omitted if the heat is generated by a chemical reaction being measured or by radiation provided onto the device, etc.

The components of the microcalorimeter, such as on chip electrostatic-actuated pumps and valves and fluidic channels, may be built on and/or in a substrate, such as a silicon or glass substrate, by standard micromachining techniques, including optical lithography and polymer (e.g., parylene) and metal deposition.

Suitable polymer materials for the polymer membranes include any polymers having sufficient structural properties to provide the polymer membrane microcalorimeter structure. If the gaps contain a vacuum rather than air, then the membranes should have a sufficiently low gas permeability to provide a vacuum in the microfluidic microcalorimeter and the pressure in the compartment is desirably no more than about 10 mbar when the vacuum gap isolated microcalorimeter is in use. Many other polymers, such as SU-8, have a sufficiently low gas permeability and may be used instead of or in combination with parylene. However, parylene is the preferred polymer membrane material for the construction of the compartment because of its low thermal conductivity, gas permeability and available valve structures. Parylene is a commercial name for a chemical family called poly-paraxylylenes. Other polymers which do not form valves may make it difficult to cut off the reagent compartment from the fluidic microchannels, which may result in large thermal leaks in a microcalorimeter that is integrated with microfluidics. On the other hand, common microfluidics materials, such as PDMS, are highly permeable to gas and very soft and therefore may not support a vacuum. Thus, PDMS is preferably used for gas isolated (such as air isolated) devices rather than vacuum isolated devices or PDMS may be used together with parylene to maintain a vacuum in a vacuum isolated device.

The major advantages of the present polymer-based microcalorimeter over existing biocalorimeters include the following. 1) Small reagents volume: the volume of reagents used in the microcalorimeters may be significantly lower than that in conventional commercial biocalorimeters such as MicroCal VP-ITC, which uses ~1 microliter (μL) of reagents. For many applications, this is very valuable because reagents (such as a newly synthesized protein) could be very expensive and scarce. 2) Liquid delivery by microfluidics: the use of a microfluidics system, with on-chip pumping and valves, enables automated delivery of liquids, which represents an advantage over other biocalorimeters that require manual injection. It also allows efficient delivery of small amounts of liquid at relatively low cost compared to the traditional, "robotic-pipette" systems such as that used by the MiDiCal microplate system developed by Vivactis. 3) Simultaneous operation of multiple calorimeters: because the calorimeters may be produced on inexpensive glass substrates by standard semiconductor processing technologies, the user could obtain and operate multiple (e.g., 100 to 1000) microcalorimeters simultaneously. This greatly improves the efficiency of calorimetric measurements. Moreover, such a low cost microcalorimeter is disposable, easy to use and saves cost on cleaning. 4) Large bandwidth: the microcalorimeter promises a fast response at ~1000 kHz. It could be used to trace the reaction of a cell to the surrounding.

Figure 6:
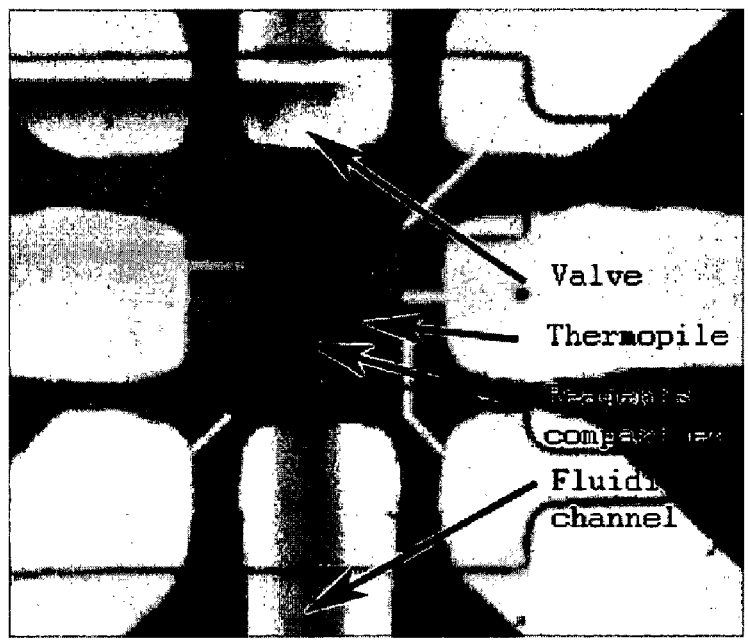
FIG. 6 shows a microcalorimeter having a PDMS fluidic channel and a SiN substrate.

It should be noted that the system shown in FIG. 5 is one example of a microcalorimeter that is integrated with microfluidics. FIG. 6 illustrates another example of a microcalorimeter made from PDMS and silicon nitride membrane. As shown FIG. 6, the structure has a compartment volume of 200 pL and thermal conductance of 50 µW/K. The SiN membrane is located under the reagents compartment. A thermopile is located adjacent to the reagent compartment. The microfluidic channels comprise PDMS channels which contain at least one valve therein.

It should be noted that the microcalorimeter of the first embodiment may be used together with the microfluidics of the second embodiment. In this case, the calorimeter body may be suspended from the material which makes up the reagent chamber. Alternatively, the microfluidics components and the reagent chamber may be formed over, under and/or adjacent to the calorimeter body.

The invention has been described with reference to various specific and illustrative embodiments. However, it should be understood that many variations and modifications may be made while remaining within the spirit and scope of the following claims.

What is claimed is:

1. A thermally isolated microcalorimeter, comprising:
   a compartment comprising a plurality of polymer membrane layers located over a substrate, the layers being separated by vacuum or gas filled gaps;
   a reagent chamber supported on one of the polymer membrane layers and thermally isolated by the vacuum or gas filled gaps, wherein a calorimeter body comprises at least one membrane in the reagent chamber;
   a thermometer in thermal communication with the reagent chamber;
   a microfluidic channel in fluid communication with the reagent chamber; and
   a microvalve disposed between the microfluidic channel and the reagent chamber.

2. The microcalorimeter of claim 1, wherein the layers of polymer membrane comprise parylene membranes and the microvalve comprises an electrostatic-actuated parylene-based microvalve, and the layers of parylene membrane have a thickness of no more than about 5 µM and the gaps have a height of no more than about 10 µm.

3. The microcalorimeter of claim 1, further comprising a micropump in fluid communication with the microfluidic channel and adapted to pump fluid through the channel, wherein the compartment, the microfluidic channel, the microvalve and the micropump are all integrated on or in the substrate.

4. The microcalorimeter of claim 1, wherein the reagent chamber has a volume of no more than about 2000 pL.

5. The microcalorimeter of claim 1, wherein the layers of polymer membrane comprise PDMS membranes.

6. A microcalorimeter, comprising:
   a polymer membrane comprising a microcalorimeter body; and
   a thermometer in thermal communication with the microcalorimeter body, wherein:
   the polymer membrane comprises a parylene membrane or a PDMS membrane;
   the polymer membrane comprises a surface of a thermally isolated reagent chamber which contacts the thermometer; and
   the microcalorimeter further comprises a compartment comprising a plurality of polymer membrane layers located over a substrate, the layers being separated by vacuum or gas filled gaps, such that the reagent chamber is supported on one of the polymer membrane layers and is thermally isolated by the vacuum or gas filled gaps.

7. The microcalorimeter of claim 6, further comprising:
   a microfluidic channel in fluid communication with the reagent chamber; and
   a microvalve disposed between the microfluidic channel and the reagent chamber.

8. The microcalorimeter of claim 6, wherein the polymer membrane comprises the parylene membrane.

9. The microcalorimeter of claim 6, wherein the polymer membrane comprises the PDMS membrane.

10. A method for taking a calorimetric measurement, comprising:
    introducing a reagent into a reagent chamber via a microfluidic channel;
    closing a microvalve to isolate the reagent chamber from the microfluidic channel; and
    measuring a temperature in the reagent chamber to determine at least one of a heat capacity or an enthalpy of the reagent,
    wherein:
    the reagent chamber is located between polymer membrane layers which are separated by gas filled or vacuum gaps which isolate the reagent chamber from environment;
    the reagent chamber is supported by at least one polymer membrane layer; and
    a calorimeter body comprises at least one membrane in the reagent chamber.

* * * * *